United States Patent [19]
Liu et al.

[11] Patent Number: 5,968,669
[45] Date of Patent: Oct. 19, 1999

[54] FIRE RETARDANT INTUMESCENT COATING FOR LIGNOCELLULOSIC MATERIALS

[75] Inventors: Feipeng Liu, Statham; Weiming Zhu, Marietta, both of Ga.

[73] Assignee: J. M. Huber Corporation, Edison, N.J.

[21] Appl. No.: 09/102,927

[22] Filed: Jun. 23, 1998

[51] Int. Cl.$^6$ .............. B32B 21/04; B32B 3/26; C09K 21/14
[52] U.S. Cl. .................... 428/537.1; 428/313.5; 428/323; 428/354; 428/920; 521/54; 523/179
[58] Field of Search ............ 521/107, 99; 523/179; 428/323, 354, 920, 537.1, 313.5

[56] References Cited

U.S. PATENT DOCUMENTS

| | | | |
|---|---|---|---|
| 3,574,644 | 4/1971 | Olstowski . | |
| 4,514,326 | 4/1985 | Sallay . | |
| 4,977,194 | 12/1990 | Haas et al. | 521/99 |
| 5,023,280 | 6/1991 | Haas et al. | 521/106 |
| 5,173,515 | 12/1992 | Von Bonin et al. | 521/107 |
| 5,229,427 | 7/1993 | Madaj | 521/107 |
| 5,246,652 | 9/1993 | Hsu et al. . | |
| 5,434,200 | 7/1995 | Kolker et al. . | |
| 5,443,894 | 8/1995 | Pollock et al. . | |
| 5,500,471 | 3/1996 | Uota | 524/262 |
| 5,538,070 | 7/1996 | Phillips et al. | 164/473 |
| 5,739,173 | 4/1998 | Lutter et al. | 521/99 |

*Primary Examiner*—Morton Foelak
*Attorney, Agent, or Firm*—Jeffrey S. Ginsberg; Carlos Nieves

[57] ABSTRACT

A fire retardant coating composition for lignocellulosic materials which comprises expandable graphite particles, a absorbent material, a polymeric binder, a carbonific material, a blowing agent, and a wetting agent. The expandable graphite particles include from about 20 to about 95% by weight of the combined amount of the expandable graphite particles and the absorbent material. The polymeric binder comprises from about 5 to about 50% by weight of the combined amount of the polymeric binder, the expandable graphite particles, and the solid absorbent material.

20 Claims, No Drawings

FIRE RETARDANT INTUMESCENT COATING FOR LIGNOCELLULOSIC MATERIALS

TECHNICAL FIELD

The present invention relates to fire retardant, intumescent coatings for lignocellulosic materials. More particularly, the invention relates to such coatings which promote the formation of insulating foams in order to provide fire protection to a wide variety of lignocellulosic materials.

BACKGROUND OF THE INVENTION

Lignocellulosic materials, which are primarily comprised of cellulose, hemicellulose and lignin, are highly combustible. Such materials include solid lumber, laminated veneer lumber, parallel strand lumber, timber strands, plywood, medium density fiberboard (MDF), hardboard, particleboard, oriented strand board (OSB) and strawboard. For obvious reasons, fire retardant and/or fire resistant lignocellulosic materials are highly desirable.

In recognition of the foregoing, various attempts have been made to impart fire protection to wood based materials. For example, U.S. Pat. No. 4,514,326 discloses impregnating cellulosic materials with alkaline earth metal tetraborates, which are treated with ammonia, sulfuric acid, sulfur dioxide, or phosphoric acid, in order to provide such materials with some degree of flame retardancy. Common disadvantages associated with impregnating cellulosic products with such materials are the reduction in panel strength, service life and product reliability.

Heat expandable graphite and its use for providing flame resistance is well known in the art and described, for example, in U.S. Pat. No. 3,574,644, the disclosure of which is incorporated herein by reference. Heat expandable graphite is formed by treating crystalline graphite, which is composed of stacks of parallel planes of carbon atoms, with intercalants such as sulfuric acid and/or nitric acid. Since no covalent bonding exists between the planes of the carbon atoms, the intercalant can be inserted therebetween. This allows the intercalant to be positioned within the graphite lattice. When the intercalated graphite is exposed to heat or flame, the inserted molecules decompose and release gases. The graphite layer planes are forced apart by the gas and the graphite expands, thereby creating a low-density, non-burnable, thermal insulation that can reflect a high percentage of heat.

U.S. Pat. No. 5,443,894 discloses a fire retardant oriented strand board which includes expandable graphite containing outer layers. The outer layers contain resin bonded wood strands with up to 20% by weight of expandable graphite particles dispersed therein. Upon exposure to external flame, the expandable graphite particles undergo intumescence and increase in volume thereby forming a layer of vermiform expanded graphite. This layer creates a flame barrier for the underlying core layer. However, the use of expandable graphite in the outer layers has been found to cause a "popcorn effect" when such board is exposed to flame. This results in the outer layer fracturing and being blown off the panels. As the outer layer is blown off the panels, noxious gases and fumes, such as sulfur dioxide and nitrogen monoxide are given off.

Another approach for imparting fire resistance to cellulosic materials is disclosed in U.S. Pat. No. 5,434,200. This patent teaches combining finely divided lignocellulosic material with an amount of a magnesium oxychloride and/or magnesium oxysulphate containing latex effective to impart water and fire resistance to the lignocellulosic material. U.S. Pat. No. 5,246,652 discloses a method of producing a wood composite which includes treating a wood composite with a soluble boron compound to provide some degree of fire retardancy. A common drawback with each of these approaches is that high levels of noxious gases are created when the cellulosic materials are exposed to intensive heat and flames.

SUMMARY OF THE INVENTION

The present invention is designed to overcome the deficiencies of the prior art discussed above. It is an object of the invention to provide a fire retardant, intumescent coating for lignocellulosic materials which expands, when exposed to intense heat and/or flames, to create a low density char foam in order to effectively protect the underlying lignocellulosic materials.

It is a further object of the invention to provide such a coating which does not emit noxious gases, acid vapor, or undesirable levels of smoke when exposed to heat and flames.

In accordance with the illustrative embodiments and demonstrating features of the present invention, there is provided a fire retardant coating composition for lignocellulosic materials which comprises expandable graphite particles, a solid absorbent material, a polymeric binder, a carbonific material, a blowing agent and a solvent. The expandable graphite particles include from about 20 to about 95% by weight of the combined amount of expandable graphite particles and solid absorbent material. The polymeric binder comprises from about 5 to about 50% by weight of the combined amount of the polymeric binder, the expandable graphite particles, and the solid absorbent material. The carbonific material comprises from about 0 to about 40% by weight of the combined amount of the carbonific material and the polymeric binder. Similarly, the blowing agent comprises from about 0 to about 40% by weight of the combined amount of the blowing agent and the polymeric material.

Other objects, features and advantages will be readily apparent from the following detailed description of preferred embodiments thereof.

DETAILED DESCRIPTION OF PREFERRED EMBODIMENTS

In accordance with the preceding summary, the present invention is directed toward a fire retardant, intumescent coating for a lignocellulosic material such as solid lumber, laminated veneer lumber, parallel strand lumber, timber strand, plywood, medium density fiberboard (MDF), hardboard, particleboard, oriented strand board (OSB), and strawboard.

The coating of the present invention preferably comprises expandable graphite particles, a solid absorbent material, a polymeric binder, a carbonific material, a blowing agent and a solvent. In the preferred embodiment, the expandable graphite particles include from about 20 to about 95% by weight of the combined amount of expandable graphite particles and solid absorbent material. The polymeric binder comprises from about 5 to about 50% by weight of the combined amount of the polymeric binder, the expandable graphite particles, and the solid absorbent material.

The heat expandable graphite particles exhibit effective flame retardant properties and significantly reduce the smoke density and the self-extinguishing time of the cured polymeric binders without adversely effecting the physical properties of the coating compositions. The heat expandable graphite particles are commercially available from a number of companies and have "onset" temperatures of from about 130° C. to about 500° C. The particles undergo dramatic expansion upon exposure to heat and flame. More particularly, the volume of the particles can increase to greater than 80 times their original volume in just a few seconds. A preferred expandable graphite is available from UCAR Carbon Company, Inc. under the name TG-317. This material has an "onset" intumescent temperature of 220° C. after being exposed to flame for a few seconds.

Expandable graphite is known to have properties that decrease thermal conductivity and provide flame retardation with an insulative bulk layer. The expandable graphite responds to high heat and flames by forming individual units of self-expansion. This allows the graphite to protect the underlying substrate from flame breakthrough thereby eliminating the formation of cracks, a condition commonly referred to as "crocodiling."

In a preferred embodiment, the coating includes a carbonific material (poly-hydro compound) such as dipentaerythritol (DPE) [$C(CH_2OH)_4$], pentaerythritol, pentaerythritol polyurethanes, phenol, triethylene glycol, resorcinol, inositol, sorbitol, dextrin, and starch. The carbonific material preferably comprises from about 0% to about 40% of the combined amount of carbonific material and polymeric binder. A preferred poly-hydro compound is pentaerythritol manufactured by Perstorp Polyols, Inc. of Toledo, Ohio. When exposed to excessive heat or flame, the carbonific materials provide a network linkage between adjacent expanded units of expandable graphite. This effectively inhibits any "popcorn" effect from taking place.

Further, when the coating of the present invention is heated to 130° C. and above, the heat expandable graphite particles release oxidizing agents such as sulfur dioxide and nitrogen monoxide gases, or acid vapor from nitric and/or sulfuric acid. These gases serve as catalysts to de-polymerize and pyrolyze the carbonific materials into intermittent chars. Consequently, a uniform and integrated insulating material is formed on the lignocellulosic substrate.

As set forth above, toxic gases, such as $SO_x$ and $NO_x$, from the expanded graphite particles and fumes from dehydration and pyrolysis of carbonific materials are known to be harmful to the neighboring environment. In the present invention, a toxic gas absorbing material is added to the coating composition to remove and eliminate these toxic gases. This material absorbs gas/acid vapors and causes nonflammable gases such as carbon dioxide and $H_2O$ to be released upon exposure to flame and fire. Typical reaction mechanisms include:

(1) $M^+HCO_3 + 1/2 H_2SO_4 \rightarrow CO_2\uparrow + 1/2(M^+)_2SO_4 + H_2O$
(2) $M^{++}CO_3 + SO_2 + 1/2 O_2 \rightarrow M^{++}SO_4 + CO_2\uparrow$
(3) $M^{++}O + SO_2 + NO \rightarrow M^{++SO}{}_4 + 1/2 N_2\uparrow$
(4) $M^{++}CO_3 + H_2SO_4 \rightarrow M^{++}SO_4 + CO_2\uparrow + H_2O$
(5) $M^{++CO}{}_3 \rightarrow M^{++O+CO}{}_2\uparrow$ where M is a monovalent or divalent cationic material. By neutralization, calcination, and oxidation of toxic gases with the above absorbent materials, the toxic gases can be eliminated from released volatiles. The formation of carbon dioxide, water vapor and calcium sulfate has also been shown to effectively form a non-flammable gas layer on the burning substrate, significantly retarding flame generation and reducing the coating surface temperature.

Preferred toxic gas absorbent materials include: limestone (CaO), calcium carbonate ($CaCO_3$), sodium hydrogen carbonate ($NaHCO_3$), and/or sodium carbonate ($Na_2CO_3$). In the preferred embodiment, the absorbent material is calcium carbonate available under the name Hubercarb® Q & W series from J. M. Huber Corporation of Edison, N.J. The preferred particles size of the absorbent materials is between from about 2 to about 20 $\mu$m and, more preferably, from about 2 to about 5 $\mu$m.

In order to increase the efficacy of the absorbent materials (e.g. absorption and neutralization of toxic gases), absorbent promoters are preferably added to the coating composition of the present invention. Such absorbent promoters are known to release water at high temperatures and include aluminum hydroxide, magnesium hydroxide, zinc borax and aluminum silicate. Such promoters preferably comprise from about 0 to about 60% by weight of the total weight of the promoters and the absorbent material. A preferred absorbent promoter is aluminum hydroxide (aluminum trihydrate or ATH) available from J. M. Huber Corporation and sold under the mark Micral®. The preferred median diameter particle size of the ATH is less than 3.5 $\mu$m.

A blowing agent (spumific material) is added to the coating in order to generate uniform intumescent char foams upon exposure to excessive heat and flames. Some preferred blowing agents include urea, butyl urea, dicyandiamide, benzene sulfonyl-hydrazide, melamine, encapsulated melamine-phosphate, chloroparaffin, guanidine, and glycine. The blowing agent preferably comprises from about 0% to about 40% of the combined amount of blowing agent and polymeric binder.

The pre-polymer binders utilized in the flame retardant coating of the present invention include the following thermosetting and thermoplastic resins: phenol formaldehyde (PF) resin, urea formaldehyde (UF), melamine reinforced urea formaldehyde (MUF) resin, urea formaldehyde resin and polyacrylic latex resin, isocyanate reinforced urea formaldehyde resin, melamine formaldehyde resin, resorcinol formaldehyde resin, isocyanate resin, and blends and co-polymers thereof.

A water based solvent (wetting agent) is added to the coating formulation. The solvent preferably comprises from about 25 to about 40% by weight of the total coating composition. In the preferred embodiment, a surfactant in the amount of about 0.1% is added to the solvent in order to improve the miscibility of the formulation. The viscosity of the entire formulation is adjusted through the addition of the wetting agent.

The coating of the present invention limits char breakthrough and surface crocodiling when the lignocellulosic material is exposed to excessive heat and/or flame. For the present purposes, "breakthrough" is defined as the point at which the char is broken, separated, or otherwise affected by the fire as the substrate is directly exposed to the flame environment.

In preparing the fire retardant, intumescent coating of the present invention, the absorbent promoter is first mixed with the solid absorbent to form a first mixture expressed herein as M1. As stated above, the absorbent promoter preferably comprises from about 0% to about 60% by weight of the total weight of M1. The expandable graphite particles are then mixed with M1 to form a second mixture expressed as M2. The expandable graphite particles preferably comprise from about 20% to about 95% of the total weight of M2. If the amount of heat expandable graphite is less than 20% of the total weight of M2, the formed coating will not provide sufficient intumescency and surface coverage to the substrate. On the other hand, if more than 95% of the graphite particles are added into the second mixture, a sufficient amount of absorbent material, which is required to eliminate the deleterious toxic gases and acid vapors, cannot be added.

The polymeric binders are then added to M2 to form a third mixture expressed as M3. The percentage of polymeric binders is preferably from about 5% to about 50% by weight of the total weight of M3.

Carbonific materials and blowing agents (spumific materials) are then added to M3. The carbonific material comprises from about 0 to about 40% by weight of the combined amount of carbonific material and polymeric binder (the carbonific material is added in a ratio of carbonific material:polymeric binder=0:1 to 0.7:1). Similarly, the blowing agent comprises from about 0 to about 40% by weight of the combined amount of blowing agent and polymeric binder (the blowing agent is added in a ratio of blowing agent:polymeric binder=0:1 to 0.7:1). In some formulations these components may be left out entirely as the particular polymeric binder may have a dual role. For example, PVAC is both a binder and a carbonific material. Further, melamine in the MUF resin may also serve as a blowing agent.

A wetting agent is added which comprises from about 25 to about 40% of the final formulation (including water from the binder plus from later addition). The wetting agent preferably includes about 0.1% by weight of surfactant to improve the miscibility between the different components. A sufficient amount of wetting agent is added until an appropriate working viscosity is achieved.

All of the components are blended in appropriate tanks and containers in a manner known in the art. The resultant flame retardant coating can be applied to lignocellulosic materials by brushing, roller coating or diluted water spray. Thereafter, the coating is cured at room temperature or by using infrared heating equipment. In order to accelerate the curing speed of the polymeric binders (resins), catalysts can be added.

The formulated fire retardant coating can be applied on various lignocellulosic materials such as solid lumber, parallel strand lumber, timber strand, plywood, particle board, medium density fiberboard, hardboard, oriented strand board, strawboard, etc. The coating can be used for interior as well as exterior applications as it is not prone to leeching. Specific applications of the coating include residential and commercial applications such as roofing, wall, floor sheathing, structural components for I-joints, underlayment, and exterior siding.

By way of example, and not limitation, Tables I–III set forth several fire retardant coating formulations of the present invention.

TABLE I

Preferred Interior Fire Retardant Coating Formulation

| Component Compounds | Preferred Percentage (by weight %) |
|---|---|
| Heat expandable graphite | 20.1 |
| Calcium Carbonate | 20.1 |
| Aluminum Hydroxide | 10.4 |
| Chloroparrifin (70% Cl) | 3.25 |
| Pentaerythritol | 2.71 |
| Blended Urea/Poly-Vinyl Acetate Resin | 17.0 |
| Water with 0.1% surfactant | 26.8 |
| Total | 100 |

TABLE II

Preferred Exterior Fire Retardant Coating Formulation

| Component Compounds | Preferred Percentage (by weight %) |
|---|---|
| Heat expandable graphite | 21.14 |
| Calcium Carbonate | 23.49 |
| Aluminum Hydroxide | 2.40 |
| Melamine | 3.13 |
| Pentaerythritol | 0.782 |
| PF resin by solid | 8.69 |
| PF extender | 4.697 |
| Surfactant | 0.270 |
| Water | 35.40 |
| Total | 100 |

TABLE III

Preferred Interior Water/Moisture Resistant Fire Retardant Coating Formulation

| Component Compounds | Preferred Percentage (by weight %) |
|---|---|
| Heat expandable graphite | 23.64 |
| Calcium Carbonate | 21.28 |
| Aluminum Hydroxide | 2.48 |
| Chloroparrifin (70% Cl) | 2.13 |
| Melamine | 2.13 |
| Pentaerythritol | 4.25 |
| Melamine reinforced urea formaldehyde | 14.19 |
| Surfactant | 0.23 |
| Water | 29.67 |
| Total | 100 |

Examples 1–17 set forth further examples of intumescent coating formulations.

EXAMPLE 1

34.2 grams of expandable graphite was mixed with 52.39 grams of PF resin in a 400 ml beaker. 9.9 grams of water with a solution of 0.1% surfactant was then added to the mixture.

EXAMPLE 2

14.6 grams of ammonium polyphosphate (Amgard® MC) was mixed with 4.70 grams of melamine, 4.221 grams of pentaerythritol, 2.231 grams of chloroparaffin, and 3.38 grams of titanium dioxide in a 400 ml beaker. After mixing the above solid powders, 21 grams of polyvinyl acetate latex (55% solid from Richard Chemicals) resin was added. 13.8 grams of 0.1% surfactant solution was then added.

EXAMPLE 3

57.4 grams of calcium carbonate and 57.4 grams of ATH were pre-mixed in a 400 ml beaker. 76.3 grams of liquid PF resin was then added. Thereafter, 21.8 grams of 0.1% surfactant solution was poured into the mixture.

EXAMPLE 4

13.1 grams of heat expandable graphite was mixed with 117.9 grams of calcium carbonate (70% concentration) in a 400 ml beaker. 86.0 grams of phenol formaldehyde resin was then added.

EXAMPLE 5

10.8 grams of heat expandable graphite was mixed with 108 grams of aluminum tri-hydrate (ATH). 70.90 grams of liquid phenol formaldehyde resin was added to the mixture. 28.1 grams of 0.1% surfactant solution was added to the slurry to obtain a desirable viscosity.

EXAMPLE 6

7.8 grams of heat expandable graphite was mixed with 35.1 grams of calcium carbonate and 35.2 grams of ATH in a beaker. 52.0 grams of liquid phenol formaldehyde resin was added along with 15.9 grams of 0.1% surfactant solution.

EXAMPLE 7

30.2 grams of heat expandable graphite was mixed with 35.2 grams of solid calcium carbonate and 35.2 grams of ATH in a beaker. 78.38 grams of polyvinyl acetate was added to the mixture. 14.0 grams of water was added to adjust the viscosity.

EXAMPLE 8

50.3 grams of heat expandable graphite was pre-mixed with 21.56 grams of solid calcium carbonate in a beaker. 47.2 grams of liquid phenol formaldehyde resin was added. Thereafter, 16.7 grams of 0.1% surfactant solution was poured in the beaker.

EXAMPLE 9

45.0 grams of heat expandable graphite was mixed with 50.0 grams of calcium carbonate, 5.1 grams of ATH, 6.66 grams of melamine, 1.665 grams of pentaerythritol, and 9.99 grams of glu-x flour (PF extender) in a 400 ml beaker. 36.5 grams of phenol formaldehyde resin and 57.9 grams of 0.1% surfactant solution was added in the beaker.

EXAMPLE 10

28.6 grams of heat expandable graphite was mixed with 66.73 grams of solid calcium carbonate. Urea-formaldehyde and polyvinyl acetate latex resin was mixed at a 50/50 ratio by weight. 51.33 grams of the blended UF/PVAC resin was added to the mixed powders. 21.8 grams of 0.1% surfactant solution was added into the above mixture to obtain the appropriate viscosity for desired applications.

EXAMPLE 11

112.7 grams of heat expandable graphite was mixed with 169.1 grams of solid calcium carbonate in a 3000 ml beaker. The above described polyvinyl acetate latex resin was pre-mixed with urea formaldehyde resin in a ratio of PVAC:UF=75:25 by weight in a 400 ml beaker with a stirrer rod. 151.7 grams of the 281.8 grams mixed resin was added to the pre-mixed powder solid. 48.8 grams of 0.1% surfactant solution was then added in the beaker.

EXAMPLE 12

367.3 grams of the formed coating from example 11 was poured into a 400 ml beaker. 6.933 grams of chloroparaffin was added to the above coating. 14.0 grams of water was then added.

EXAMPLE 13

55.0 grams of heat expandable graphite was mixed with 27.48 grams of ATH, 54.96 grams of calcium carbonate, 7.398 grams of pentaerythritol and 8.878 grams of chloroparaffin a 400 ml beaker. 77.5 grams of mixed polymeric resin as described in example 11 and 42.3 grams of 0.1% surfactant solution was added in the beaker.

EXAMPLE 14

50.2 grams of heat expandable graphite was mixed with 45.2 grams of calcium carbonate and 5.0 grams of aluminum tri-hydrate in a 400 ml beaker. 29.24 grams of liquid MUF was added in the beaker. 10.04 grams of pentaerythritol, 5.02 grams of melamine, and 5.02 grams of chloroparaffin were added in the beaker. 62.0 grams of 0.1% surfactant solution was added to adjust the viscosity to the appropriate condition.

EXAMPLE 15

80.0 grams of heat expandable graphite was mixed with 20.0 grams of calcium carbonate. 4.285 grams of chloroparaffin, 4.285 grams of melamine, and 8.57 grams of pentaerythritol were added to the mixture. 52.5 grams of UF resin was also mixed in with the above powder mixture.

59.9 grams of 0.1% surfactant solution was added to allow the mixture to achieve an appropriate coating viscosity. After being stirred for 4 min., 8.57 grams of emulsifiable MDI was added into the formed coating.

Each of the coatings formed in the manner set forth above was stirred for about 4 minutes. and then applied to 23⅞"× 3⅞"×⅜" OSB panels for 2 foot tunnel testing and 4"×4" OSB panels for cone calorimeter testing by brushing. The coating application level was determined by measuring the sample initial weight and final weight after being coated. The coated panels were cured at 100° C. for about 5 min. and then conditioned in an environmental room at a humidity of 50–55% and temperature of 20±1° C. for three days to two weeks before testing.

Two additional examples are set forth in examples 16 and 17.

EXAMPLE 16

45.0 grams of heat expandable graphite was mixed with 50.0 grams of calcium carbonate, 5.1 grams of ATH, 6.66 grams of melamine, 1.665 grams of pentaerythritol, and 9.99 grams of glu-x flour in a 400 ml beaker. 36.5 grams of phenol-formaldehyde resin and 57.9 grams of 0.1% surfactant solution was then added.

EXAMPLE 17

Particleboard panels were coated with the same coating as example 16 formulation. The coating application level was determined by measuring the sample's initial and final weight after being coated.

The coating of example 16 was stirred for about 4 minutes and then applied to 23⅞"×3⅞"×⅝" plywood panels for 2 foot tunnel testing and 4"×4" plywood panels for cone calorimeter testing by brushing. The coating of example 17 was applied to particle board panels. The coating application level for examples 16 and 17 was determined by measuring the sample initial weight and final weight after being coated. The coated panels were cured at 100° C. for about 5 minutes and then, conditioned in an environmental room at a humidity of 50–55% and temperature of 20±1° C. for more than three days before testing.

The testing results for each of the examples are summarized in Tables IV and V. As used throughout, fire retardancy was determined by flame spread index of tested samples based upon ASTM D 3806-79. Ignition time, heat release rate, mass loss rate, and smoke density were determined by cone calorimeter measurements based upon ASTM E 1354-94 standard at a heat flux of 50 kW/m$^2$. The influence of toxic gases and volatiles on the combustion process was indirectly determined by the following procedure: (1) residue ash and chemicals of burnt samples after 2 foot tunnel testing were collected; (2) 0.5 grams of the collected samples was dispersed in a 250 ml flask with 100 ml of distilled water for each sample. This mixture was then heated at 100° C. until 50 ml of solution was left in the flask.

TABLE IV

Two Foot Tunnel Testing Results

| Example No | Coat lbs/msf[a] | FSI (%)[b] | pH | Flame Breakthrough | Popcorn Effect |
|---|---|---|---|---|---|
| 1 | 208.8 | 23.1 | 6 | no | yes |
| 2 | 123.2 | 41,1 | 2 | yes | no |
| 3 | 333.6 | 88.4 | 7 | no | yes |
| 4 | 180.4 | 59.0 | — | no | no |
| 5 | 290.8 | 59.0 | — | no | slight |
| 6 | 220.6 | 66.7 | — | no | slight |
| 7 | 137.9 | 35.9 | 6 | no | no |
| 8 | 62.3 | 26.0 | 8 | no | yes |
| 9 | 312.0 | 28.2 | — | no | no |
| 10 | 226.4 | 28.2 | — | no | no |
| 11 | 237.7 | 38.0 | 5 | no | no |
| 12 | 280.7 | 38.0 | 5 | no | no |
| 13 | 169.5 | 31.0 | — | no | no |
| 14 | 166.4 | 23.7 | 6 | no | no |
| 15 | 361.4 | 23.1 | 6 | no | no |
| 16 | 232.9 | 30.8 | 7 | no | no |
| 17 | — | 23.1 | — | no | no |

[a]refers to the coating surface coverage on the two sides of a panel per 1000 ft.$^2$
[b]refers to flame spread index As shown in Table IV, the coating of example 1 exhibited significant fire retardancy. However, it failed to prevent the "popcorning" of graphite from the combustion surface. In contradistinction, the coating of example 2 did not exhibit the "popcorn" effect, however, flame breakthrough did take place.

Examples 9, 10, 14, 15, and 16 provided excellent fire retardant performance and also eliminated the "popcorn" effect. Examples 14 and 15 met the requirement of Class I or Class A fire retardant standards in terms of flame spread index. In the tests, significant swelling or expansion was observed in most samples upon exposure to fire and flame. The intumescent coating effectively protected the substrate from flame and fire through the formation of a low density and highly insulative blanket. Apparently, the addition of absorbents changes the burnt residue or char into acid/base characters. As a result, it is conceivable that the corresponding volatile from the basic chars should be basic, the acid chars acidic and the neutral chars neutral. For most samples, the pH value was between 6 and 7, which indicates that the added absorbent material plays a crucial role in the combustion process to buffer the acid/base character of the burning compounds.

TABLE V

Cone Calorimeter Testing Results

| Example No. | Coat lbs/msf[a] | Ignition Time (sec.)[b] | 60's HRR (kW/m$^2$)[c] | Avg. SEA (m$^2$/kg)[d] |
|---|---|---|---|---|
| 1 | 150.3 | 224.0 | 25 | 125 |
| 2 | 93.6 | 159.6 | 61.43 | 24.8 |
| 3 | 481.8 | 250.0 | 39.0 | 72.7 |
| 4 | 399.6 | 29.2 | 113.0 | 118.7 |
| 5 | 232.7 | 38.23 | 189.9 | 127.1 |
| 6 | 304.5 | 34.7 | 167.9 | 114.7 |
| 7 | 171.3 | 243.0 | 49.3 | 28.1 |
| 8 | 129.1 | 52.7 | 59.9 | 88.1 |
| 9 | 394.8 | 640.0 | 28.0 | 28.1 |
| 10 | 184.1 | 384.0 | 27.0 | 46.2 |
| 11 | 245.7 | 591.0 | 10.1 | 65.3 |
| 12 | 180.0 | 376.0 | 22.0 | 35.0 |
| 13 | 333.8 | 250.0 | 21.0 | 64.8 |
| 14 | 653.0 | 1125 | 19.0 | — |
| 15 | 467.8 | 320.0 | 20.0 | 37.0 |
| 16 | 213.4 | 792.0 | 16.6 | 3.37 |
| 17 | 527.3 | 614.0 | 13.7 | 31.4 |

[a]refers to the coating surface coverage on the two sides of a panel per 1000 ft.$^2$
[b]refers to the time required for the sample to ignite upon exposure to a heat flux of 50 kW/m$^2$ under cone calorimeter test
[c]refers to the average heat release rate in the first 60 seconds after the sample has been ignited
[d]refers to the average specific extinction area in the whole burning process The cone calorimeter is a useful tool for characterizing material behavior in terms of fire safety. For example, ignition time is referred to as the interval for the sample to ignite upon its exposure to a fixed heat flux under the heating cone. Table V shows that the ignition time of example 14 is 1125 at a heat flux of 50 kW/m$^2$, nearly 5 times higher than example 1. Self-extinguishment was observed in examples 7, 10 and 15. This indirectly confirms that non-combustible gases such as water vapor and carbon dioxide are generated due to the reaction of added absorbent material and their promoters in the coating formulation.

Furthermore, specific extinction area (SEA) provides a method to evaluate smoke intensity as the sample is exposed to flame. At a heat flux of 50 kW/m$^2$, the average SEA for plywood is about 87 m$^2$/kg and the average SEA for OSB is 170 m$^2$/kg.

The appearance of the coating, as applied to the ligno-cellulosic material, can be controlled by adding certain pigments such as titanium dioxide, zinc borax, oxalates, mica, perlite, clays, and silicon dioxide. The appearance can also be controlled by adding an additional layer which may include a blend of mica, titanium dioxide, silicon dioxide, zinc borax, boric acid, ammonium polyphosphate, PF, and surfactant solution. Table VI sets forth an example of such an additional layer.

| Component Compounds | Preferred Percentage (by weight %) |
|---|---|
| Mica | 28.42 |
| Titanium Dioxide | 1.57 |
| Silicone Dioxide | 1.57 |
| Boric Acid | 0.14 |
| Zinc Borax | 0.14 |
| Phenol formaldehyde resin (by solid) | 3.51 |
| Surfactant | 0.50 |
| Ammonium polyphosphate | 0.696 |
| Water | 63.45 |
| Total | 100 |

Example 18 sets forth an example of a second layer which is applied on top of a first coat of the intumescent coating to control the appearance of the coating. Example 19 sets forth a further example of an intumescent coating which comprises a second layer to control the appearance of the coating.

EXAMPLE 18

31.2 grams of mica was mixed with 3.12 grams of titanium dioxide in a 200 ml beaker. 15.4 grams of phenol formaldehyde resin was added in the beaker. 34.9 grams of water with 0.1% surfactant concentration, 0.297 gram of boric acid and 0.297 gram of zinc borax were added to the mixture.

EXAMPLE 19

90.0 grams of mica was blended with 5.0 grams of titanium dioxide, 5.0 grams of silicon dioxide, 0.448 grams of boric acid, 0.448 grams of zinc borax, and 2.204 grams of ammonium polyphosphate in a 400 ml beaker. After adding 22.04 grams of PF resin into the beaker, 189.4 grams of 0.1% surfactant solution was mixed in to form a stable top layer coating. This coating was brushed on the OSB panels, which are coated with the same coating formulation as example 16.

TABLE VII

Two Foot Tunnel Testing Results

| Example No. | Coat lbs/msf | FSI (%) | pH | Flame Breakthrough | Popcorn Effect |
|---|---|---|---|---|---|
| 18 | a | 38.0 | — | no | no |
| 19 | b | 35.9 | 5 | no | no |

[a] first layer of coating from example 13 with a loading level of 240 lbs/msf, second layer of coating from example 18 with a loading level of 94.6 lbs/msf
[b] first layer of coating from example 16 with a coating level of 307.9 lbs/msf, second layer of coating from example 19 with a loading level of 244.1 lbs/msf As shown in Table VII, example 19 provided desirable fire retardant performance and also eliminated the "popcorn" effect.

TABLE VIII

Cone Calorimeter Testing Results

| Example No. | Coat lbs/msf[a] | Ignition Time (sec.)[b] | 60's HRR (kW/m$^2$) | Avg. SEA (m$^2$/kg) |
|---|---|---|---|---|
| 18 | a | 278.0 | 22.0 | 68.7 |
| 19 | b | 900 | 10.4 | 36.7 |

[a] first layer of coating from example 13 with a loading level of 440 lbs/msf, second layer of coating from example 18 with a loading level of 182.3 lbs/msf
[b] first layer of coating from example 16 with a coating level of 311.4 lbs/msf, second layer of coating from example 19 with a loading level of 313.2 lbs/msf As shown in Table VIII, example 19 exhibited low smoke and long ignition time.

The present invention may be embodied in other specific forms without departing from the spirit or essential attributes thereof and accordingly reference should be made to the appended claims rather than to the foregoing specification as indicating the scope of the invention.

What is claimed is:

1. A fire retardant coating composition for lignocellulosic materials comprising:
   expandable graphite particles;
   an absorbent material for absorbing toxic gases emitted from said expandable graphite particles in the event that such particles are subjected to heat;
   a poymeric binder, and
   a wetting agent;
   said expandable graphite particles comprising from about 20 to about 95% by weight of the combined amount of said expandable graphite particles and said solid absorbent material, said polymeric binder comprising from about 5 to about 50% by weight of the combined amount of said polymeric binder, said expandable graphite particles, and said solid absorbent material.

2. The composition of claim 1 further including a carbonific material, said carbonific material comprises from about 0 to about 40% by weight of the combined amount of said carbonific material and said polymeric binder.

3. The composition of claim 1 further including a blowing agent, said blowing agent comprising from about 0 to about 40% by weight of the combined amount of said blowing agent and said polymeric binder.

4. The composition of claim 1 wherein said solid absorbent material is selected from the group consisting of limestone, calcium carbonate, sodium hydrogen carbonate and sodium carbonate.

5. The composition of claim 2 wherein said carbonific material is selected from the group consisting of dipentaerythritol, pentaerythritol, pentaerythritol polyurethane, phenol, triethylene glycol, resorcinol, inositol, sorbitol, dextrin, and starch.

6. The composition of claim 3 wherein said blowing agent is selected from the group consisting of urea, butyl urea, dicyandiamide, benzene sulfonyl-hydrazide, melamine, chloroparaffin, guanidine, and glycine.

7. The composition of claim 1 wherein said polymeric binder is selected from the group consisting of phenol formaldehyde resin, urea formaldehyde, melamine reinforced urea formaldehyde resin, polyacrylic latex resin, isocyanate reinforced urea formaldehyde resin, melamine formaldehyde resin, resorcinol formaldehyde resin, isocyanate resin, and mixtures and co-polymerizations thereof.

8. The composition of claim 1 wherein said expandable graphite particles are treated with an intercalant material.

9. The composition of claim 8 wherein said intercalant material is selected from the group consisting of intercalation compounds of $SO_x$, $NO_x$, and a halogen.

10. The composition of claim 1 further including an absorbent promoter, said absorbent promoter comprising from about 0 to about 60% by weight of said combined amount of said absorbent material and said absorbent promoter.

11. The composition of claim 10 wherein said absorbent promoter is selected from the group consisting of calcium hydroxide, aluminum trihydrate, magnesium hydroxide, and zinc hydroxide.

12. The composition of claim 1 wherein said wetting agent includes a surfactant in the amount of 0.1% by weight of the total amount of said wetting agent.

13. A fire retardant coating for lignocellulosic materials comprising a first layer and a second layer;
   said first layer including expandable graphite particles, an absorbent material for absorbing toxic materials emitted from said expandable graphite particles in the event that such particles are subjected to heat, a polymeric binder, and a wetting agent, said expandable graphite particles comprising from about 20 to about 95% by weight of the combined amount of said expandable graphite particles and said solid absorbent material, said polymeric binder comprising from about 10 to about 50% by weight of the combined amount of said polymeric binder, said expandable graphite particles, and said solid absorbent material;

said second layer comprising a pigment, a resin and a wetting agent.

14. The composition of claim 13 wherein said pigment comprises at least one material selected from the group consisting of mica, titanium dioxide, silicon dioxide, oxalates, zinc borax, perlite, and clay.

15. The composition of claim 13 further including a carbonific material, said carbonific material comprises from about 0 to about 40% by weight of the combined amount of said carbonific material and said polymeric binder.

16. The composition of claim 13 further including a blowing agent, said blowing agent comprising from about 0 to about 40% by weight of the combined amount of said blowing agent and said polymeric binder.

17. The composition of claim 13 wherein said solid absorbent material is selected from the group consisting of limestone, calcium carbonate, sodium hydrogen carbonate and sodium carbonate.

18. The composition of claim 15 wherein said carbonific material is selected from the group consisting of dipentaerythritol, pentaerythritol, pentaerythritol polyurethane, phenol, triethylene glycol, resorcinol, inositol, sorbitol, dextrin, and starch.

19. The composition of claim 13 wherein said polymeric binder is selected from the group consisting of phenol formaldehyde resin, urea formaldehyde, melamine reinforced urea formaldehyde resin, polyacrylic latex resin, isocyanate reinforced urea formaldehyde resin, and mixtures and co-polymerizations thereof.

20. The composition of claim 13 further including an absorbent promoter, said absorbent promoter comprising from about 0 to about 60% by weight of said combined amount of said absorbent material and said absorbent promoter.

* * * * *